(12) United States Patent
Weston (10) Patent No.: US 8,821,725 B2
(45) Date of Patent: Sep. 2, 2014

(54) WASTE BIN

(76) Inventor: Owen Charles Weston, Jindabyne (AU)

( * ) Notice: Subject to any disclaimer, the term of this patent is extended or adjusted under 35 U.S.C. 154(b) by 443 days.

(21) Appl. No.: 12/864,403

(22) PCT Filed: Jan. 21, 2009

(86) PCT No.: PCT/AU2009/000060
§ 371 (c)(1),
(2), (4) Date: Jul. 23, 2010

(87) PCT Pub. No.: WO2009/092131
PCT Pub. Date: Jul. 30, 2009

(65) Prior Publication Data
US 2010/0294730 A1    Nov. 25, 2010

(30) Foreign Application Priority Data

Jan. 25, 2008  (AU) ................................ 2008200412
Aug. 29, 2008  (AU) ................................ 2008207656

(51) Int. Cl.
| | | |
|---|---|---|
| *B01D 29/00* | (2006.01) | |
| *B65B 21/02* | (2006.01) | |
| *B65B 69/00* | (2006.01) | |
| *B65F 3/02* | (2006.01) | |
| *B65G 65/04* | (2006.01) | |
| *B65G 65/34* | (2006.01) | |
| *B60P 3/00* | (2006.01) | |
| *B62D 33/00* | (2006.01) | |

(Continued)

(52) U.S. Cl.
USPC ........... 210/241; 210/248; 210/250; 210/455; 210/767; 414/404; 414/406; 220/562; 220/563; 220/564; 141/286; 137/574; 137/581

(58) Field of Classification Search
USPC .............. 210/241, 248, 250, 317, 335, 416.1, 210/455, 767, 908; 414/404; 141/86; 134/104.1, 104.2, 104.4, 108
See application file for complete search history.

(56) References Cited

U.S. PATENT DOCUMENTS 1,331,239 A * 2/1920 Cartwright .................... 210/241
1,802,340 A * 4/1931 Fieroh ........................... 198/311

(Continued)

FOREIGN PATENT DOCUMENTS

AU  2004203634 A1 * 2/2006
AU  2004203634 B2 * 1/2007 ................ B65F 1/00

(Continued)

OTHER PUBLICATIONS

International Search Report for PCT/AU2009/000060, Completed by the Australian Patent Office Mar. 5, 2009, 2 Pages.

(Continued)

*Primary Examiner* — Nam Nguyen
*Assistant Examiner* — Clare Perrin
(74) *Attorney, Agent, or Firm* — Brooks Kushman P.C.

(57) ABSTRACT

A slurry handling and disposal system is provided for waste slurry and particulates. The system includes a waste bin provided with support structures for retaining a flexible removable filter element with a filter element supported above a floor of the waste bin. The particulate matter component of a volume of the waste slurry and particulates deposited in the filter element is retained in said filter element while the liquid component of the waste slurry and particulates are collected in a base portion of the waste bin.

16 Claims, 8 Drawing Sheets

(51) Int. Cl.
*B65D 88/12* (2006.01)
*F02M 37/22* (2006.01)
*B01D 24/00* (2006.01)
*B01D 25/00* (2006.01)
*B01D 27/00* (2006.01)
*B01D 33/00* (2006.01)
*B01D 35/00* (2006.01)
*B01D 37/00* (2006.01)
*B01D 61/00* (2006.01)
*C02F 1/00* (2006.01)
*B65B 1/04* (2006.01)
*B65B 3/04* (2006.01)
*B67C 3/00* (2006.01)
*E03B 5/00* (2006.01)
*F17D 1/00* (2006.01)

(56) References Cited

U.S. PATENT DOCUMENTS

| | | | | |
|---|---|---|---|---|
| 2,271,434 | A * | 1/1942 | Johnson | 414/21 |
| 4,536,286 | A * | 8/1985 | Nugent | 210/202 |
| 5,626,748 | A * | 5/1997 | Rose | 210/241 |
| 5,685,978 | A * | 11/1997 | Petrick et al. | 210/241 |
| 6,506,310 | B2 * | 1/2003 | Kulbeth | 210/780 |
| 7,410,576 | B2 * | 8/2008 | Brouillard et al. | 210/241 |
| 7,479,225 | B1 * | 1/2009 | Venable | 210/250 |
| 2004/0045882 | A1 * | 3/2004 | Chilibeck | 210/137 |
| 2004/0105741 | A1 | 6/2004 | Inglese | |
| 2006/0033378 | A1 * | 2/2006 | Sargent et al. | 298/6 |

FOREIGN PATENT DOCUMENTS

| | | | |
|---|---|---|---|
| DE | 3231186 A1 | 4/1983 | |
| WO | WO 2006011858 A1 * | 2/2006 | B01D 21/20 |

OTHER PUBLICATIONS

Written Opinion of the International Searching Authority for PCT/AU2009/000060, Completed by the Australian Patent Office Mar. 5, 2009, 4 Pages.

International Preliminary Report on Patentability for PCT/AU2009/000060, Completed by the International Bureau of WIPO, Date of Issuance Jul. 27, 2010, 5 Pages.

* cited by examiner

WASTE BIN

The present invention relates to treatment and disposal of waste and, more particularly to admixtures of waste particulate matter and contaminated liquid.

BACKGROUND

Waste disposal of excess or unwanted residue from industrial processes where such excess or residue consists of slurries of particulate matter and contaminated liquid, may be facilitated if the particulate matter can be separated from the liquid. One example of such a slurry is that of residual ready-mixed concrete delivered to construction sites.

Ready-mixed concrete is typically delivered to construction sites, when significant quantities are required, by concrete mixer trucks. In large projects, further concrete handling equipment may then be required for placement of the concrete at positions remote from the delivering trucks, such as concrete pumping units and crane slung hoppers.

To maintain mixer trucks and other concrete handling equipment in good working order it is essential that residual concrete be removed from the surfaces of the equipment, such as mixer drums, chutes, pipes and hoppers and the like, by cleaning with water spray.

Frequently, the slurry so produced is allowed to discharge to some location on the construction site, or worse, into storm water drains. Discharge onto the construction site may result in the leaching of toxic water from the setting slurry into ground water or become a nuisance for later work such as landscaping for example. Discharge to drains is both illegal in many jurisdictions and may lead to blockage as well as pollution of waterways.

It is an object of the present invention to address or at least ameliorate some of the above disadvantages.

BRIEF DESCRIPTION OF INVENTION

Accordingly, in a first broad form of the invention, there is provided a slurry handling and disposal system for waste slurry and particulates; said system including a waste bin; said waste bin provided with support structures for retaining a flexible removable filter element; said filter element supported above a floor of said waste bin; the particulate matter component of a volume of said waste slurry and particulates deposited in said filter element substantially retained in said filter element; the liquid component of said waste slurry and particulates collected in a base portion of said waste bin.

Preferably, said waste bin is a skip-type waste bin; said waste bin being of welded steel construction.

Preferably, said waste bin is provided with lifting fixtures disposed along opposing sides of said upper perimeter of said waste bin; said lifting fixtures adapted for manipulating said waste bin by a waste bin handling and transport vehicle.

Preferably, said waste bin has at least a partially open top and comprises an upper perimeter rim with inwardly sloping side portions extending to a base portion; said waste bin provided with a filter support structure.

Preferably, said filter support structure comprises a mesh basket-like structure; said structure releasably retaining thereon said removable filter element.

Preferably, said mesh basket-like structure is releasably supported within said waste bin.

Preferably, said mesh basket structure is a permanent fixture within said waste bin.

Preferably, one side of said waste bin is provided with a lowered upper rim section extending substantially along one of said sides to form a cut out portion; said cut out portion providing access to said basket-like structure by a discharge chute of a ready mix concrete truck.

Preferably, said filter support structure comprises a substantially horizontal base portion extending across said waste bin in a first direction and at least partly along said waste bin in a second direction normal to said first direction; said base portion situated intermediate said base portion and said lowered upper rim section; said filter support structure further comprising a substantially upright portion extending from a free edge of said horizontal base portion opposite said lowered upper rim section, to proximate said upper rim; the arrangement being such as, to form a basket-like structure within said waste bin; both said horizontal base portion and said substantially upright portion comprise framing elements supporting steel mesh.

Preferably, said at least partially open top of said waste bin is provided with a lockable lid; said lid hingedly attached adjacent said substantially upright portion of said filter support structure; said lid urged into an open position by gas struts.

Preferably, said waste bin is provided with at least one baffle structure extending across said waste bin; said at least one baffle structure restricting excessive movement of said liquid if said waste bin is moved from one location to another; said at least one baffle structure provided with apertures to allow drainage of said liquid to a discharge end of said waste bin.

Preferably, said waste bin is provided with liquid discharge means; said discharge means including a liquid discharge port disposed in one side of said waste bin and adjacent to said base portion; said port adapted for hose connection to a pumping means for transfer of said liquid to a receiving vessel.

Preferably, said flexible removable filter element comprises a sheet of permeable woven polymer material; said woven polymer material arranged to restrict passage therethrough of particles larger than a predetermined size.

Preferably, said predetermined size is in the range of 0.5 to 25 microns.

Preferably, said predetermined size is in the range of 0.5 to 50 microns.

Preferably, said predetermined size is in the range of 0.5 to 100 microns.

Preferably, said sheet of permeable woven polymer material of a generally rectangular form; said sheet provided with a pattern of reinforcing webbing.

Preferably, said sheet of permeable woven polymer material is provided with lifting rings at least at each of four corners of said generally rectangular form; said lifting rings arranged for attachment to a hook of a lifting device when said rings are gathered together to form said filter element into a sling for removal of said filter element and said particulates from said waste bin.

Preferably, said filter element is held in place within said filter support structure by retaining mechanisms arranged along at least portions of said perimeter rim of said waste bin.

In another broad form of the invention, there is provided a waste bin for the separation of admixtures of particulate matter and liquid; said waste bin provided with a disposable filter element retained in said waste bin on a filter element support structure; said filter element comprising a flexible sheet of material provided with lifting rings such that said filter element and said particulate matter may be lifted from said waste bin; said waste bin further provided with liquid discharge means.

Preferably, said disposable filter element is releasably attached to at least a portion of a perimeter rim of said waste bin.

Preferably, said filter element is releasably retained in a filter element support structure; said filter support structure comprising a basket-like structure extending across said waste bin and at least partially along said waste bin.

Preferably, said filter element comprises a generally rectangular sheet of liquid permeable material; said permeable material comprising a woven polymer fabric; said permeable material adapted to restrict passage therethrough of particulate matter larger than a predetermined size; said sheet provided with lifting rings so as to form said sheet into a sling for removing said particulate matter from said waste bin.

Preferably, said predetermined size is in the range of 0.5 to 25 microns.

Preferably, said predetermined size is in the range of 0.5 to 50 microns.

Preferably, said predetermined size is in the range of 0.5 to 100 microns.

Preferably, said liquid permeable material is held in place by filter element retaining mechanisms so as to substantially line said basket-like structure.

Preferably, said waste bin is further provided with a liquid discharge means located at a first end of said waste bin.

Preferably, said waste bin is further provided with a tilt support under a base portion of said waste bin; said tilt support located at an end of said waste bin opposite said liquid discharge means so as to bias liquid in said waste bin towards said discharge means.

Preferably, said liquid discharge means comprises a drainage connection fitting recessed into one of said sides of said waste bin.

Preferably, said liquid discharge means comprises a pump located in an enclosure within said waste bin; said pump accessible via an opening in one of said sides of said waste bin.

Preferably, said waste bin is provided with a lifting crane mounted to a peripheral rim of said waste bin; a hook of said crane engaging with said lifting rings of said filter element so as to transfer said sling of particulate material from said waste bin.

In still another broad form of the invention, there is provided a method of separating aggregate and other particulate matter from a slurry; said method including the steps of:—
(a) providing a modified skip-type waste handling bin fitted with a filter support structure and a liquid discharge means,
(b) fitting a flexible sheet of filter material within said filter support structure,
(c) directing said slurry onto said filter material,
(d) allowing liquid and particles in suspension to drain through said filter material into said waste handling bin,
(e) forming said filter material into a sling containing said aggregate and other particulate matter,
(f) lifting said sling from said waste handling bin and transferring said sling to a standard waste handling bin for disposal.

Preferably, said modified skip-type waste handling bin is a rectangular steel bin comprised of four sides sloping inwardly from an upper rim to a base; said waste handling bin adapted for transport by a transport vehicle.

Preferably, said modified skip-type waste handling bin is of a height adapted to fit below a hopper and pump of a mobile concrete pumping unit.

Preferably, said waste handling bin is provided with at least two chevron shaped baffle structures extending across the width of said waste handling bin; said baffle structures sloping upwardly from a floor of said waste handling bin to a level below the level of an upper rim of said waste handling bin; said baffle structures provided with apertures to allow liquid to form a level volume extending throughout said waste handling bin.

Preferably, said sheet of filter material is of generally rectangular form; said sheet provided at least at four corners with lifting rings.

Preferably, said slurry is comprised of a residual concrete mixture washed from concrete mixing and concrete handling equipment at a construction site.

BRIEF DESCRIPTION OF DRAWINGS

Embodiments of the present invention will now be described with reference to the accompanying drawings wherein.

DETAILED DESCRIPTION OF PREFERRED EMBODIMENTS

First Preferred Embodiment

Figure 1:
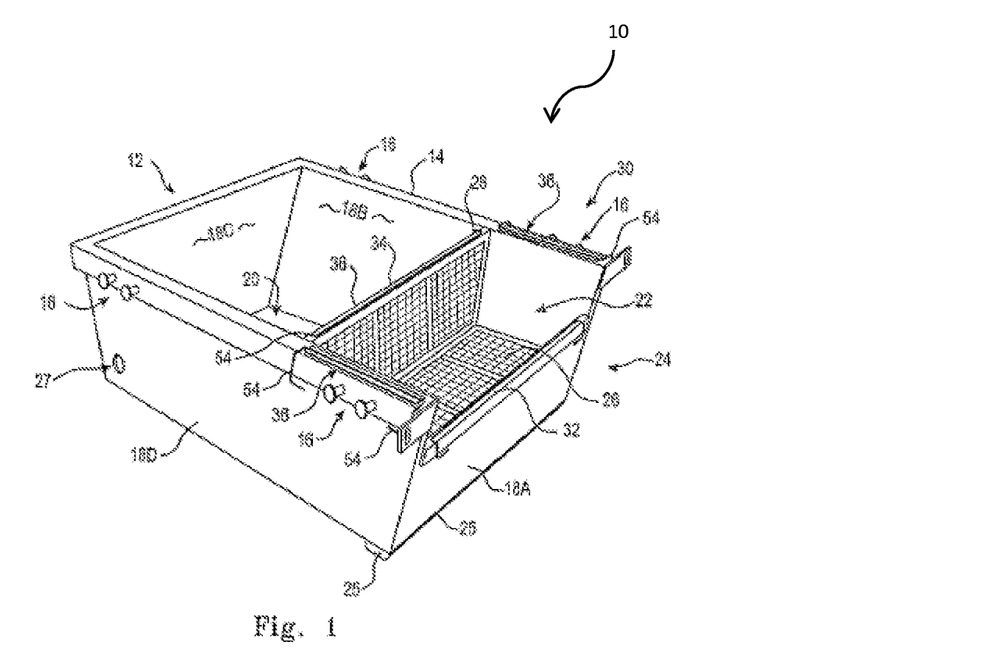
FIG. 1 is a perspective view of a preferred embodiment of a waste handling bin according to the invention.
Figure 3:
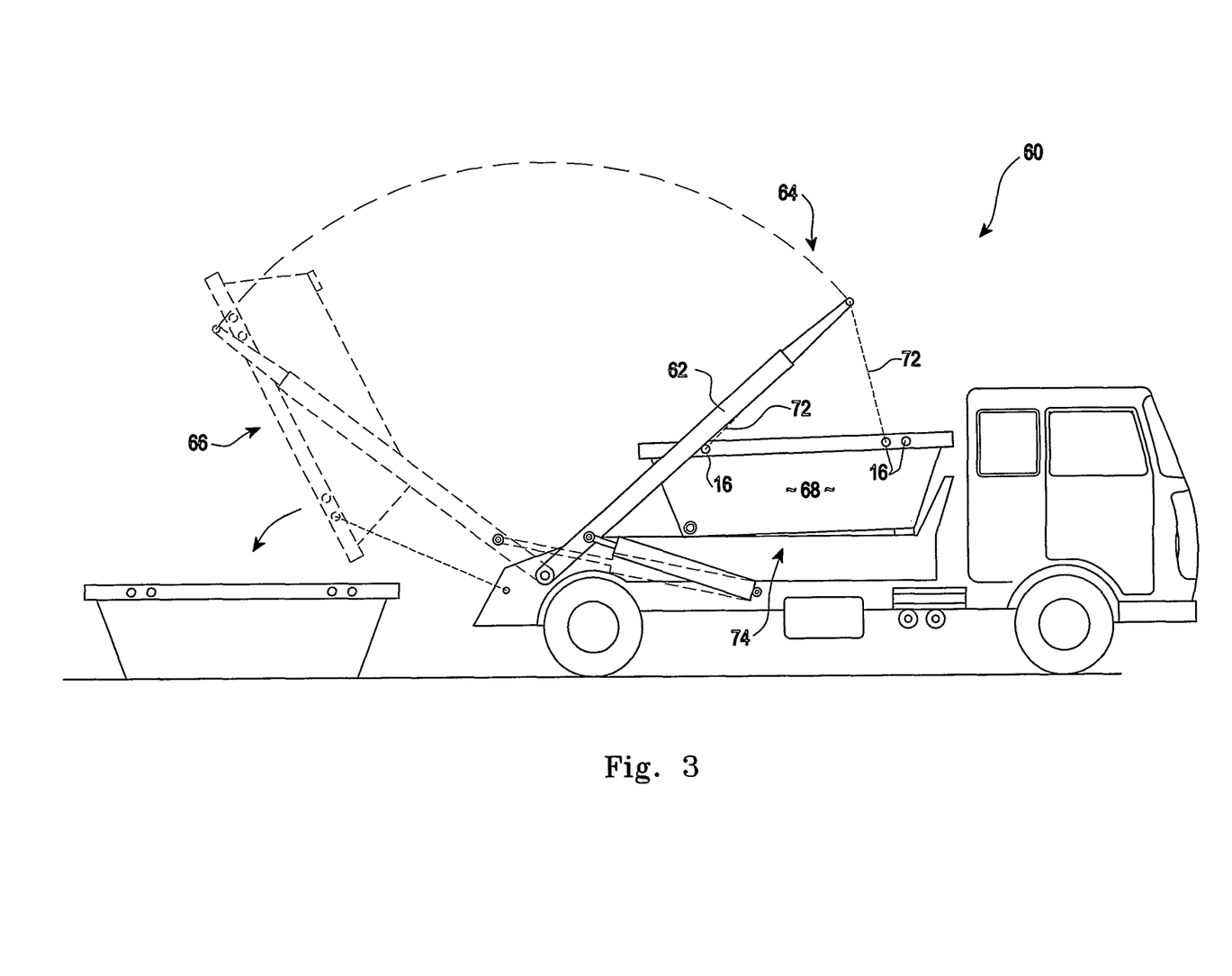
FIG. 3 is a side elevation view of a waste handling bin transporting vehicle manipulating the bin of FIG. 1.

With reference to FIG. 1, a waste handling system 10 is comprised of a waste handling bin 12, sometimes known as a skip. Such bins are of welded steel construction having a reinforced upper rim 14 to which are attached at least four lifting fixtures 16 disposed along two opposing sides of the bin. The four sides 18A, 18B, 18C and 18D all slope inwardly from rim 14 to the base 20 so that bins may be nested together for economy of transport. Lifting fixtures 16 are arranged so as to allow attachment of lifting means (as can be seen in FIG. 3) for loading and unloading bins onto and off special transport vehicles. Alternatively, bins may be lifted by other means such as cranes for example.

The waste handling bin 12 is modified from a standard bin, by the provision of a filter element support rack 22. For the particular purpose of handling residual concrete waste, bin 12 may preferably be further modified by the provision of a cut out portion 24 in side 18A to allow for the level at which ready-mixed concrete truck chutes discharge. As may be seen in FIG. 1, filter element support rack 22 is formed of a base portion 26 and a substantially upright divider portion 28. In at least one preferred embodiment of the invention filter element support rack 22 is removably retained within waste handling bin 12. Preferably it is constructed of welded steel or aluminium mesh with a mesh size providing adequate support for the filter element.

Waste handling bin 12 is further provided with a tilting support 25 underneath waste handling bin 12 at that end of waste handling bin 12 provided with filter element support rack 22. A drainage connection fitting 27 is recessed into side 18D at the opposite lower corner of bin 12.

Filter element support rack 22 preferably extends part of the length of waste handling bin 12, but may alternatively be formed as a continuous support platform or base portion 26, disposed substantially parallel to the base 20 and at a level between the base and the rim of cut out portion 24. In either case, the rack 22 forms a basket like-structure 30 within the waste handling bin 12. Both base portion 26 and upright divider portion 28 are formed of framing elements and steel mesh.

In the form shown in FIG. 1, the upper perimeter of the basket-like structure 30 is made up of portions of the upper rim of sides 18B and 18D, the edge 32 of cut out portion 24, and the upper edge 34 of divider portion 28. Each of these elements of the upper perimeter of the basket-like structure 30 is provided with a filter element retaining mechanism 36.

Figure 2:
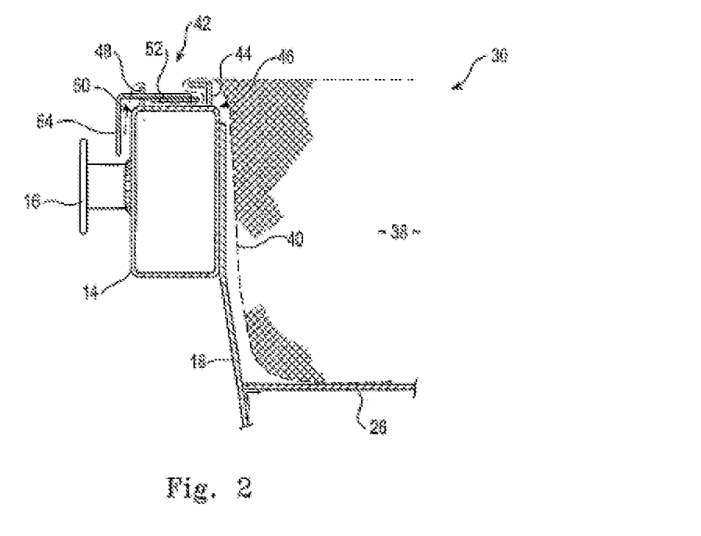
FIG. 2 is a cross section of an upper rim portion of the waste handling bin of FIG. 1 showing a filter element retaining mechanism.

With reference to FIG. 2, a filter element 38 according to the invention comprises a sheet 40 of woven polymer material (shown as a dashed line), which restricts the passage of particulate matter larger than approximately 0.75 µm, but allows the permeation of water and fine particulate matter less than approximately 0.75 µm carried in suspension. The sheet 40 of the filter element is of an extent sufficient to line the basket-like structure 30 and overlap the filter element retaining mechanisms 36 of the upper perimeter elements.

The overlap portions 42 of sheet 40 are retained in place by the filter retaining mechanisms 36. Each mechanism 36 is comprised of a length of steel angle section 44, the edge of one flange of which is welded adjacent an inner edge 46 of upper rim 14 (or edge 32 of cut out portion 24) so that the other flange is horizontal and directed outwardly from the inner edge 46. A similar length of flat bar 48 is welded, on edge, to outer edge 50 of upper rim 14 (or edge 32). A second length of flat bar 52 is of a dimension to loosely nest between the upright flange of the angle section 44 and the welded flat bar 48 with sufficient clearance to allow the partial wrapping of the overlap portions of sheet 40 as shown in FIG. 2. Flat bar 52 is provided with handles 54 to allow the manipulation of flat bar 52 into and out of the sheet retaining position. Prior to use, a bin is fitted with a sheet 40 of filter element to effectively line the basket-like structure 30.

Second Preferred Embodiment

Figure 9:
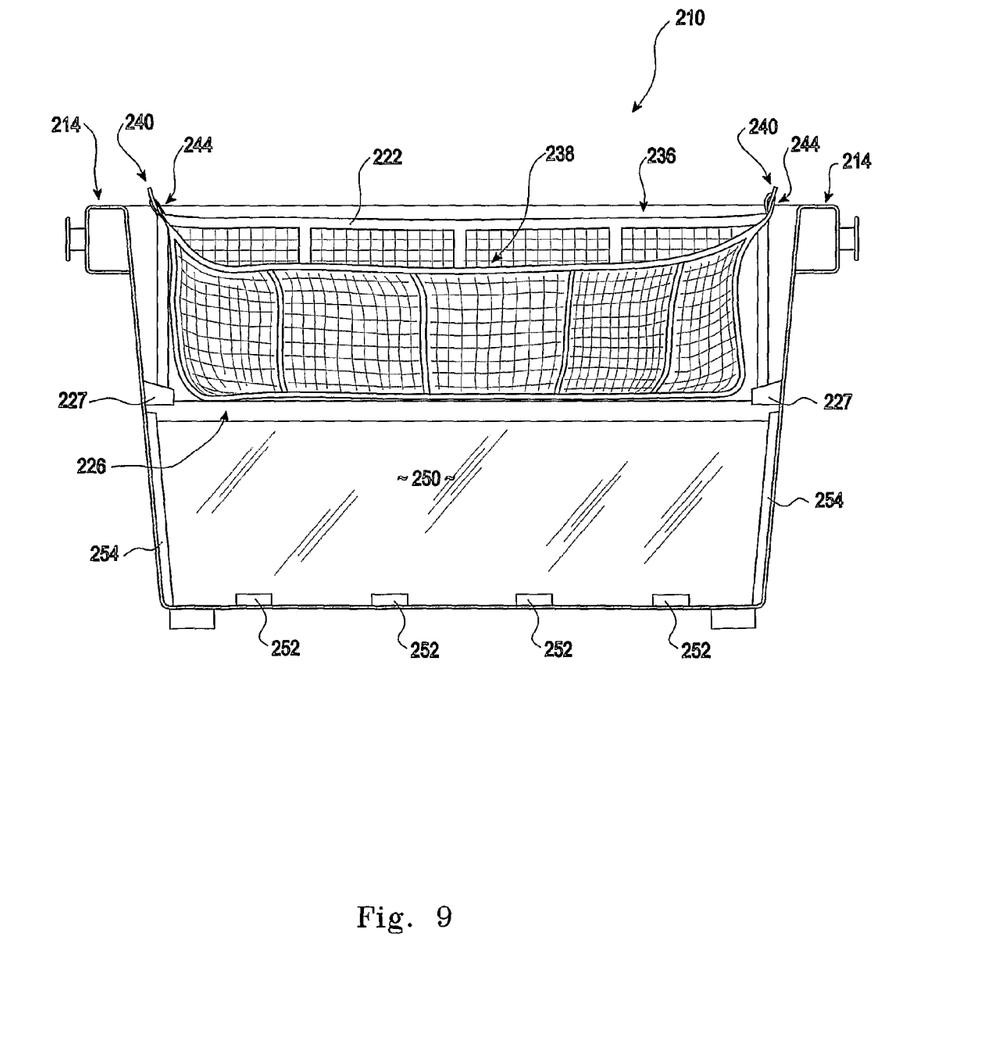
FIG. 9 is a sectioned end view of a further preferred embodiment of a waste bin showing an alternative filter element support and retention arrangement and at least one baffle for controlling waste liquid movement.

In this preferred embodiment with reference to FIG. 9, a waste skip 210 may again be modified as described above, that is with a lowered side portion to allow ready access to the skip by a concrete truck discharge chute. The skip may again be fitted with a tilting support to direct liquid waste to one end of the bin for discharge via an outlet or pumping arrangement.

However in the present preferred embodiment with reference to FIG. 9, the removable filter element 238 is not retained at the perimeter 214 of the waste bin 210. Rather it is supported and releasably attached to separate filter support structure 222 supported within the bin. An exemplary arrangement is shown in FIG. 9, in which a filter supporting basket structure 222 is located in the waste bin 210. In the example shown in FIG. 9, basket structure 222 is supported on a grating 226, itself supported on ledges or supporting structures 227 welded to the inside surfaces of the waste bin. It will be understood that this arrangement is by way of example only and that the supporting basket could equally well be supported from the perimeter rim of the waste bin, or resting on a fixed grating spanning a section of the bin.

The filter supporting basket structure 222 is provided with retaining means to hold the filter element 238 in an opened out condition, to allow the depositing of solid west concrete matter onto the filter element. Again it will be understood that various arrangements can be employed to hold the filter element 238 in an open extended position within the basket structure 222, such as by clamping of the filter edges to the basket structure upper perimeter 236, or by hooking rings 244 provided at the corners of the sheet forming the filter element 238 over suitable projections 240 at the corners of the basket structure 222.

The waste bin in each of the above described embodiments may be fitted with one or more baffles 250 extending across the width of the waste bin as can be seen in FIG. 9. One or more baffles 250 serve to prevent excessive movement of liquid waste in those cases where the waste bin of the invention needs to be moved between a location of use, that is where waste concrete is deposited in the bin, and where the filter element and its contents, and the liquid waste is discharged from the bin. Apertures 252 at the base of each baffle 250 to allow liquid waste to drain towards the discharge end of the bin. Preferably, the one or more baffles 250 are releasably retained in the waste bin 210, for example by sliding into retaining rails 254 welded to the inside surfaces of the bin.

Figure 7:
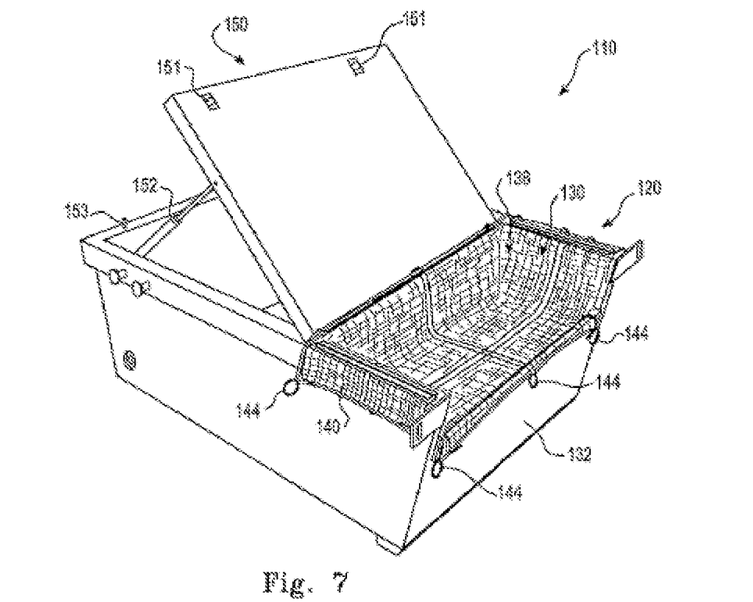
FIG. 7 is a perspective view of the waste handling bin of FIG. 1 with the filter element of FIG. 6 fitted for use.

As shown in FIG. 7, waste handling bin 110 of the improved skip of the invention, may be provided with a lockable lid 150, covering the remaining open portion of the bin. Preferably lid 150 is hinged at the rear of the filter supporting basket structure 130, and is provided with gas struts 152 for urging the lid 150 into the open position shown in FIG. 7. For securing the open portion of the bin from interference and contamination by foreign objects, the lid may be provided with apertures 151 and the edge of the bin provided with posts 153 which pass through apertures 151 and project above the surface of the lid when closed. Posts 153 are provided with apertures for receiving the hasp of a padlock, (not shown) thus securing the contents of the bin from interference.

Bins of the type used in the present invention, are transported and handled by specially adapted vehicles. A typical configuration of a bin handling vehicle is shown in FIG. 3. It comprises a truck chassis 60 to which is fitted a pivoting frame 62, hydraulically activated to swing between a forward in-transit position 64 and a load/unload or bin tipping position 66 shown by dashed lines. Such frames are also provided with means (not shown) to vary the effective distance from pivot point to a cross shaft 70. A bin 68 is attached to the cross shaft 70 of the frame 62 by four chains 72 hooking onto the inner pairs of the lifting fixtures 16 and swung into position onto the bed 74 of the truck for transport. The bin may be unloaded from the truck by a reverse motion of the pivoting frame, maintaining the bin in a level disposition. The frame and chains may further be controlled, as well known in the art, so that the bin is swung out over the back of the truck and into a tipped position so as to discharge the contents of the bin as shown by dashed lines in FIG. 3.

For the purposes of the present invention, preferably two bins are transported to a site for use, one, the special waste handling bin 12 constructed as described above, stacked or nested in a second standard bin. These bins are then unstacked at the site.

Figure 4:
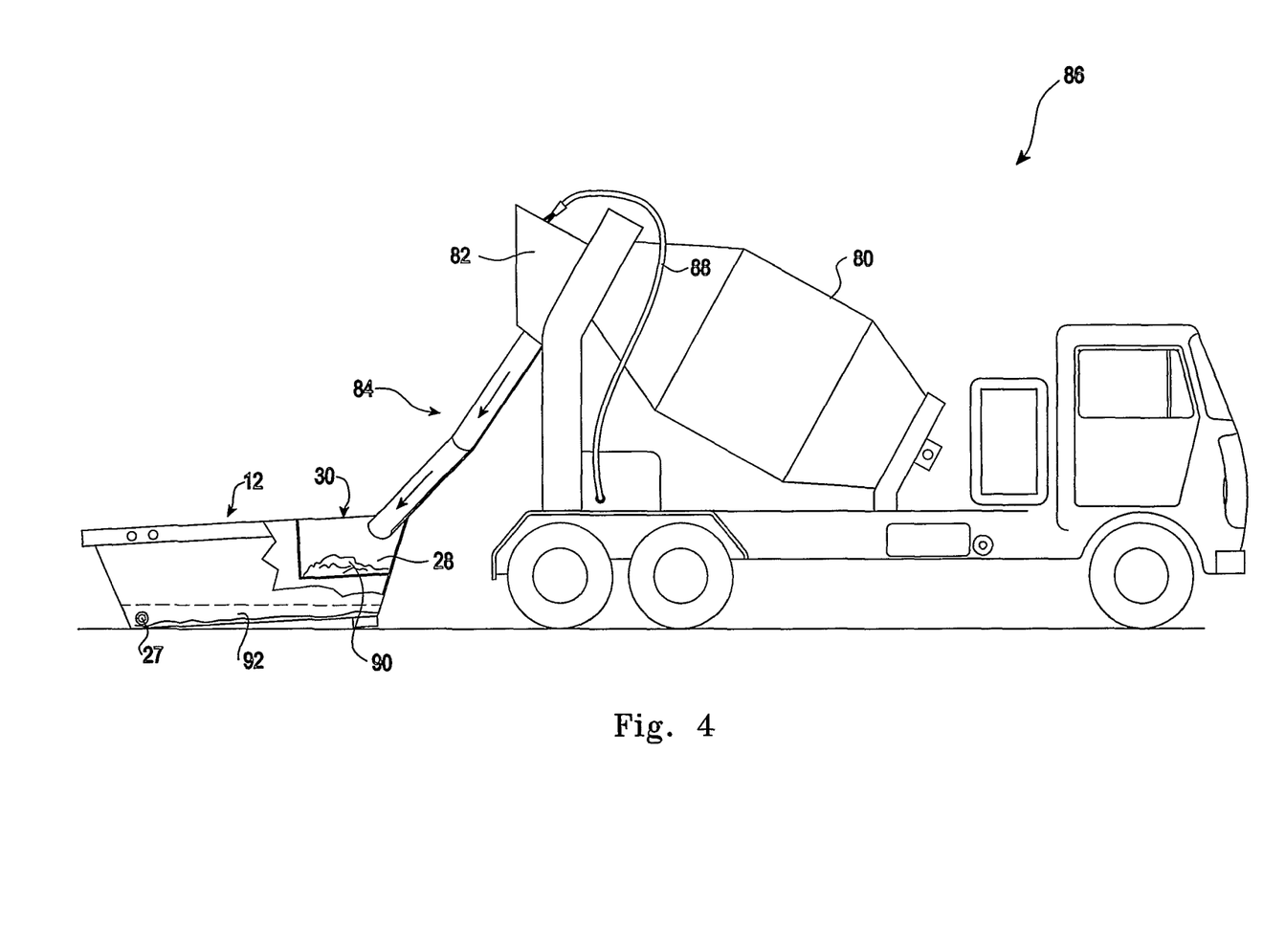
FIG. 4 is a side elevation view of the waste handling bin of FIG. 1 in use for receiving flushed residual concrete slurry from a ready-mixed concrete truck.

FIG. 4 shows a waste handling bin 12 in use for an on-site cleaning operation of the mixer drum 80, hopper 82 and delivery chutes 84 of a concrete mixer truck 86. Typically, residual quantities of concrete remain in the drum 80, adhering to the internal helical spiral blade of the drum (not shown) as well as to the external hopper 82 and delivery chutes 84. Ready-mix concrete trucks are normally provided with an on-board source of meter and this is sprayed via hose 88 into the drum while it is rotating, and onto the hopper and chutes to dilute the residual concrete into a slurry for removal.

The residual concrete slurry is directed onto the filter element 28 in the basket-like structure 30 of waste handling bin 12 so that the aggregate and larger particulate matter 90 of the slurry are captured by the filter element 28, permitting substantially only water and dissolved matter 92 to permeate the filter and collect in the base of waste handling bin 12. Depending on the size of the bin and the residue of concrete remaining in any given mixer truck, a number of truck residues may be accommodated in a waste handling bin.

The water collected in the base of the bin is contaminated with cement and should not be discharged to municipal drains or otherwise be permitted to contaminate ground water. The drainage connection fitting 27 allows connection of pumping means (not shown) to transfer the contaminated water into a suitable holding tank for disposal at a waste water treatment facility, or it may be pumped back into the drum of the mixer truck for reuse in the production of fresh concrete at a concrete production plant.

Figure 5:
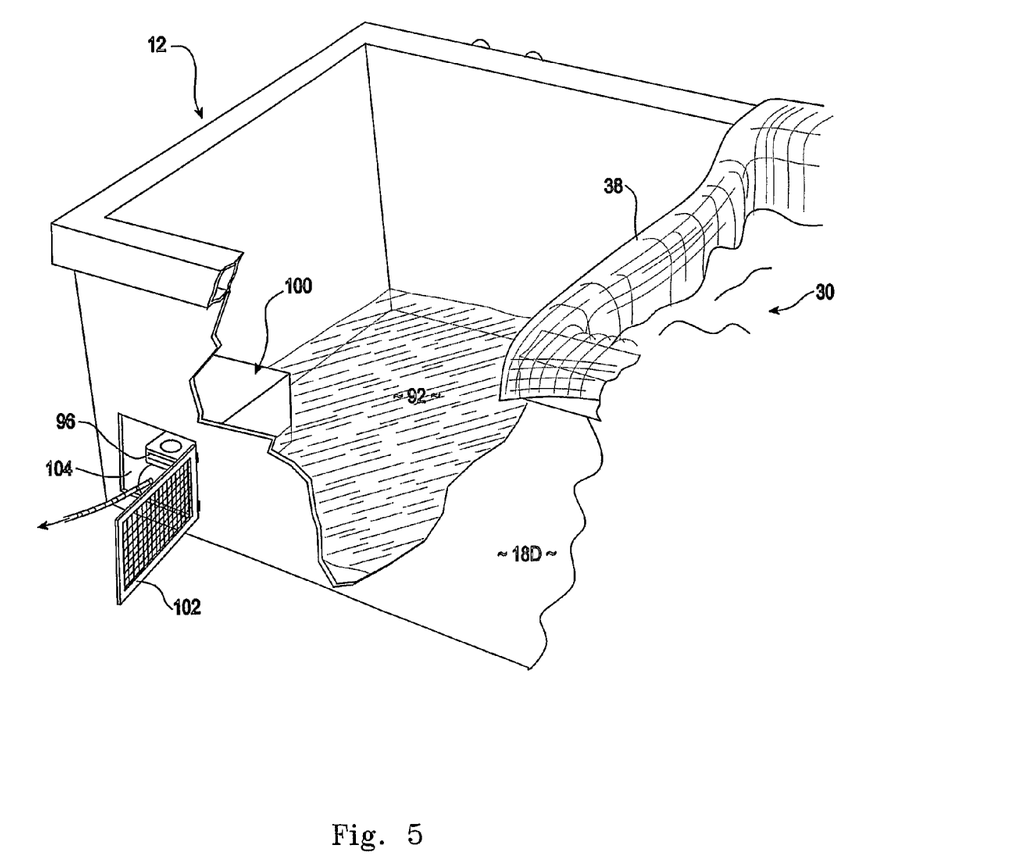
FIG. 5 is a part perspective view of a further embodiment of the waste handling bin of FIG. 1.

In at least one preferred embodiment of the invention, the waste handling bin 12 is further provided with an in-built pump 96 as shown in FIG. 5. The pump may be housed in an enclosure 100 built into a corner of the waste handling bin 12, isolated from the liquid contents of the bin. A scavenging inlet (not visible in FIG. 5) communicates with the enclosure and is connected to the inlet port of the pump via a flexible hose for example. Access to the pump may be provided through an openable grill 102 over an opening 104 in side 18D.

When a quantity of residual aggregate and particulate matter 90 has accumulated in the filter element 38 of the basket-like structure 30 in the special waste handling bin 12, the filter element sheet 40 may be released from the retaining mechanisms 36 and the residue bundled up in the sheet for transfer to the second standard bin. A fresh filter element is then installed in the basket-like structure to allow further deposition of slurry as required.

Figure 6:
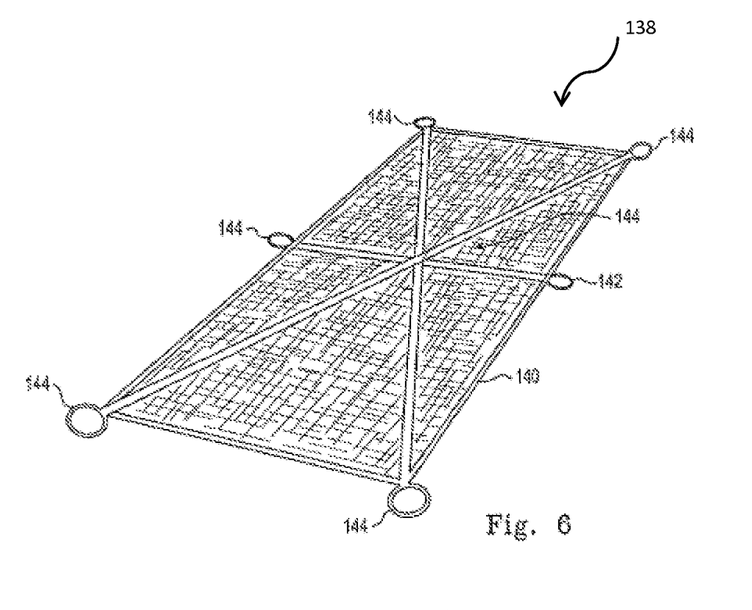
FIG. 6 is a perspective view of a preferred form of a sheet of material forming the filter element of FIG. 2.

In a preferred embodiment, the flexible sheet 138 of filter material of a filter element 120 is of generally rectangular form as shown in FIG. 6 and is of a dimension sufficient for the sheet to generally line the basket-like structure 130 with the edges of the sheet 138 overlapping the upper perimeter 136 and lowered upper rim section 132 as shown in FIG. 7. Alternatively, as described above, the edges of the filter sheet may be clamped or otherwise releasably retained at the perimeter of a supporting basket structure, itself supported within the waste bin.

Referring again to FIG. 6, the perimeter 140 of the sheet of material 138 is reinforced, preferably with a pattern of webbing 142. Preferably, webbing is provided along the diagonals and between the mid points of the longer edges of the sheet of material as can be seen in FIG. 6. At each of the four corners, and preferably at the midpoints of the longer edges of the sheet 138, lifting rings 144 are attached to the selvedge or perimeter cable.

In use, in this embodiment of the invention, when the filter element has accumulated a desired or maximum quantity of aggregate and other particulate matter, the retaining mechanism described above holding the filter element in the basket-like structure 130 is released. The four or six rings 144 can then be gathered as shown in FIG. 8 and attached to the hook of a suitable lifting device to form a sling 150 for transfer of the bundled waste material from the waste handling bin 110 to a standard waste bin 152.

Figure 8:
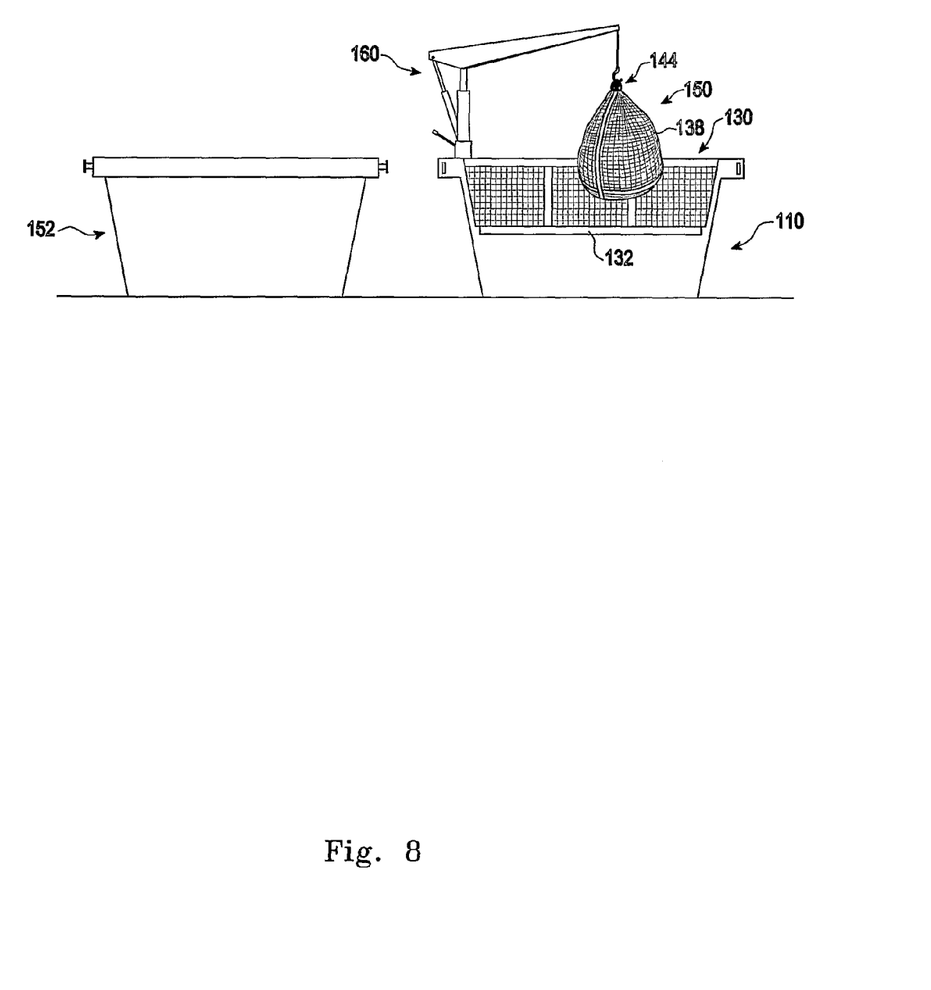
FIG. 8 is a front view of the waste handling bin of FIGS. 1 and 7 and a standard waste bin showing a preferred means of transfer of a sling of aggregate and other particulate material from the waste handling bin to the standard waste bin.

In one preferred form of the waste handling bin, the bin may itself be fitted, in this instance, with a hand operated hydraulic crane 160 as shown in FIG. 8, for transfer of the sling of material 150 to the standard waste handling bin 152, thereby making the system substantially self contained. Crane 160 may be demountable and erected for use, for example at a rear corner of the waste handling bin on a suitable support structure.

The standard bin, when full of residual aggregate and particulate matter, may be loaded onto a transport vehicle and removed for disposal at a suitable landfill site.

Both the waste handling bin and the standard bin are able to be lifted by cranes and thus may be used in the construction of multi story buildings if required.

Third Preferred Embodiment

Figure 10:
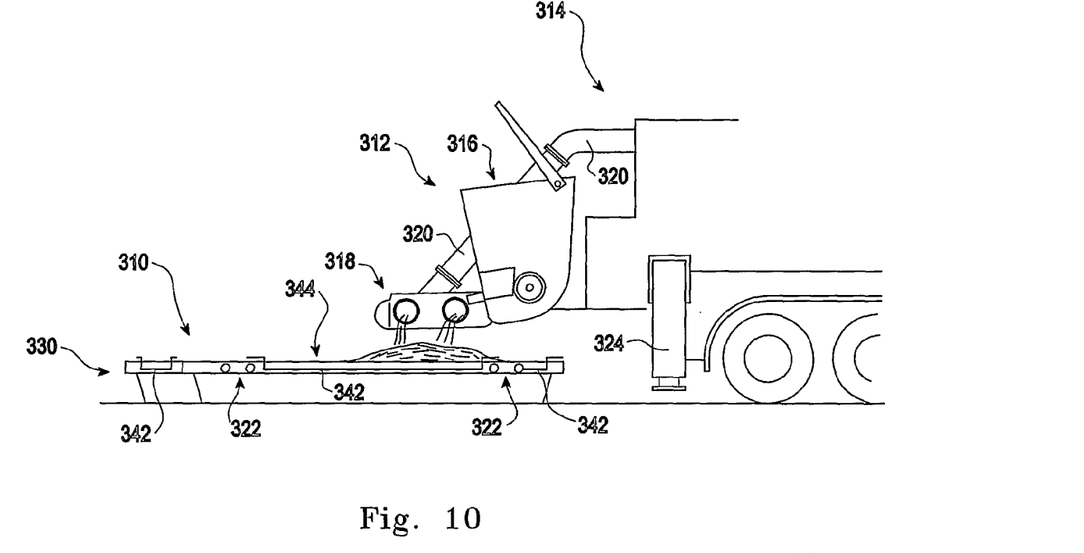
FIG. 10 illustrates a third preferred embodiment.

In a third preferred embodiment of the invention, with reference to FIG. 10 a special waste bin 310 is provided for the specific purpose of receiving waste concrete slurry from a mobile concrete pumping unit 312. Typically a pumping unit is mounted on a heavy truck 314 and arranged with a receiving hopper 316 and concrete pump 318 at the rear of the vehicle, as shown in FIG. 10. Ready mixed concrete from a ready mixed concrete truck is fed into the hopper 316 with the pump 318 driving the concrete through conduits 320 to a location of use remote from the pumping unit 312.

The hopper 316 is located at a level adapted to allow feeding of concrete by the chute of a ready mixed concrete truck, as described above and as shown in FIG. 4, so that perforce the concrete pump 318, which is of course located below the hopper 316, is quite close to ground level. The special waste bin 310 of this embodiment, provides a waste handling system for the slurry deriving from the cleaning of the hopper and pump.

Figure 11:
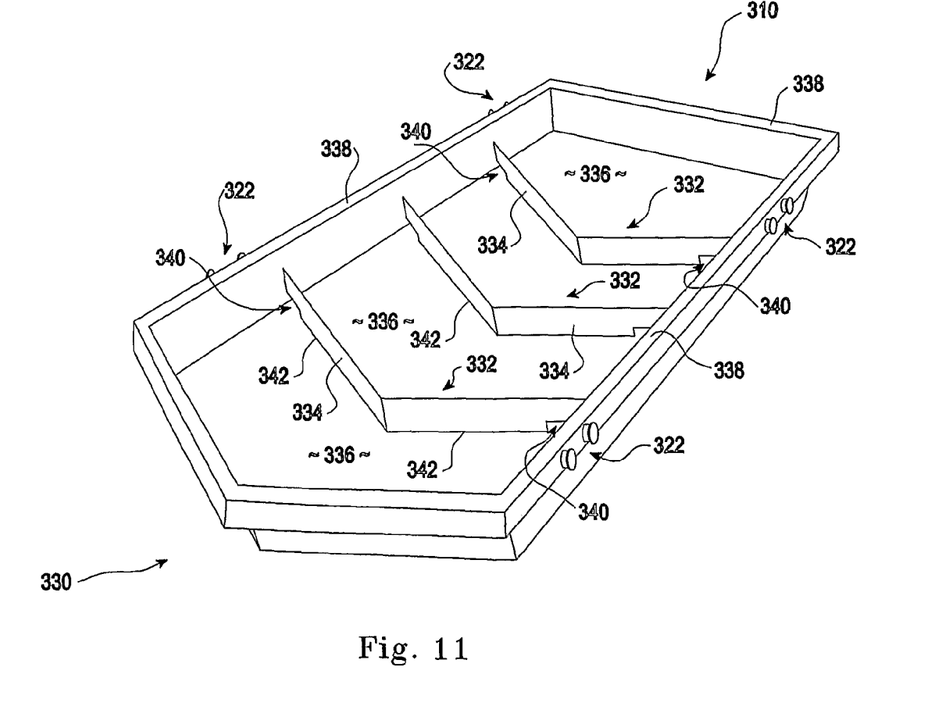
FIG. 11 illustrates details of construction of the bin in accordance with the third preferred embodiment.

With reference now to FIG. 11 also, the waste bin 310 of the present embodiment is again constructed on the principles of a skip-type waste bin, being of welded steel construction, with inwardly sloping sides and provided with lifting fixtures 322 at the sides of the bin for lifting onto and off a skip transporting vehicle in the manner described above.

The bin 310 of this embodiment however is only some 300 mm in height to allow a concrete pumping truck 314 to back its hopper and pump over the bin 310, or for the bin to be slid into place under the hopper and pump. In some situations where the slope of the ground is such as to prevent these manoeuvres, the jacks 324 of the concrete pumping truck 314 may be used to raise the level of its pump 318 and allow the bin 310 to be slid into position. In at least one preferred form of the waste bin 310, it may be provided with short leveling jacks (not shown) at the four corners of the bin to allow it to be leveled for use. Preferably, the capacity of the bin 310 of this embodiment is approximately 1.25 $m^3$, measuring 2.4 m by 1.8 m.

Turning now to the particular arrangement of bin 310, as can be seen in FIG. 11, the far end, or discharge end 330 of the bin (that is the end distant from the concrete pump 318 when in use), is preferably formed in a shallow, chevron shape to facilitate emptying of liquid waste.

Arranged at intervals within the bin 310 are baffle structures 332, also arranged in chevron shape and with the walls 334 forming the baffles sloping in the direction of the discharge end 330. The baffles structures 332 rise from the floor 336 of the bin to a little below the upper periphery 338 of the bin. Each baffle 332 is provided with liquid passage apertures or cut-outs 340 arranged at the bottom edge 342 of the baffle 332 and adjacent each of the sides of the bin 310.

The upper periphery 338 of the bin 310 is provided with holding fixtures 342 (indicated in FIG. 10) similar to those described for the first preferred embodiment above, for retaining a filter element 344 stretched over the open top of the bin. This filter element 344 is similar or the same as that previously described and shown in FIG. 6, comprising a flexible sheet of liquid permeable material with the same filtering characteristics for retaining particulate matter. Also as previously described, the filter element 344 is formed with at least four, preferably six lifting rings or loops and with reinforcing webbing, so that when released from the holding fixtures 342, it may be gathered into a sling for its removal from the bin 310 for disposal as shown in FIG. 8 for example. In addition to acting as baffles to control the movement of liquid in the bin during handling and transport, the baffle structures 332 serve to aid in support of the filter element 344 as this receives the considerable load of waste concrete issuing from the pump and hopper and associated equipment of the concrete pumping truck 314.

In use, a bin 310 of this embodiment is again delivered to a site for use by a bin transporting vehicle and placed into position at the rear of a concrete pumping truck. The bin is either slid into position under the hopper and pump of the truck or the truck backed into the required position. Cleaning of the hopper and pump now proceeds, with the waste concrete and water, (both the contaminated water issuing from the concrete slurry and water from the washing operation), being deposited onto the surface of the filter element. The water passes through the filter, initially flowing into the first baffle-formed section of the bin but gradually forming a level volume of waste water extending throughout the bin. Particulate mater is retained on the filter element.

The above describes only some embodiments of the present invention and modifications, obvious to those skilled in the art, can be made thereto without departing from the scope and spirit of the present invention. Thus, although the above described embodiment of the invention is directed at the handling and disposal of residual waste concrete, it will be appreciated that the principles of the invention may equally be applied to any admixture of liquid and solid material where these demand separate disposal or recycling strategies.

The invention claimed is:

1. A waste slurry handling and disposal system for use with a mobile ready-mix concrete vehicle, the system comprising:
a waste bin which is moveable with a height adapted to receive waste slurry from said mobile ready-mix concrete vehicle, the waste bin having a base, sidewalls and a front end adjacent said mobile ready-mix concrete vehicle and a back end remote from said mobile ready-mix concrete vehicle, the back end having a chevron shape oriented on a longitudinal axis, wherein the chevron shape has an apex which is pointed away from the front end, the waste bin having at least one baffle structure arranged on the longitudinal axis and spaced along the base extending between the sidewalls of the waste bin, the at least one baffle structure having a chevron shape generally conforming to the chevron shape on the back end, each of the at least one baffle structure having at least one fluid passing aperture at a lower edge of the at least one baffle structure adjacent to a side wall of the waste bin; and a liquid discharge port located near the back end of the waste bin.

2. The system of claim 1 wherein the waste bin has more than one at least one baffle structure.

3. The system of claim 1 further comprising at least two lifting fixtures mounted on an outside surface of the sidewalls adjacent the front and back ends.

4. The system of claim 1 wherein the sidewalls have inward slopes.

5. The system of claim 1 further comprising a latching lid.

6. The system of claim 1 further comprising a tilt support under the front end of the waste bin so that a floor is declining toward the back end.

7. The system of claim 6 further comprising a plurality of leveling jacks affixed to the waste bin.

8. The system of claim 1 further comprising a pump for transfer of liquid having an inlet which is removably coupled to the liquid discharge port.

9. The system of claim 1 wherein the at least one fluid passing aperture of each of the at least one baffle structure is located at an intersection of the lower edge of the respective at least one baffle structure and one of the side walls.

10. A waste slurry handling and disposal system for use with a mobile ready-mix concrete vehicle, the system comprising:
a waste bin which is moveable with a height adapted to receive waste slurry from said mobile ready-mix concrete vehicle, the waste bin having a lower base, sidewalls and a front end adjacent said mobile ready-mix concrete vehicle and a back end remote from said mobile ready-mix concrete vehicle, the back end having a chevron shape oriented on a longitudinal axis, wherein the chevron shape has an apex which is pointed away from the front end, the waste bin having at least one baffle structure configured to restrict excessive movement of liquid during movement of the waste bin, wherein the at least one baffle structure is arranged on the longitudinal axis and spaced along the lower base and between the sidewalls of the waste bin, the at least one baffle structure having a chevron shape conforming to the chevron shape on the waste bin, each of the at least one baffle structure having fluid passing apertures at lower edges of the at least one baffle structure adjacent to a side walls of the waste bin;
a liquid discharge port located near the back end of the waste bin;
at least two lifting fixtures mounted on an outside surface of the sidewalls adjacent the front and back ends; and
a tilt support under the front end of the bin so that the floor is declining toward the back end.

11. The system of claim 10 wherein the waste bin has more than one at least one baffle structure.

12. The system of claim 10 wherein the sidewalls have inward slopes.

13. The system of claim 10 further comprising a latching lid.

14. The system of claim 10 further comprising a plurality of leveling jacks affixed to the waste bin.

15. The system of claim 10 further comprising a pump for transfer of liquid having an inlet which is removably coupled to the liquid discharge port.

16. A method of handling and disposal for waste slurry and particulates, said method comprising:

moving a waste bin into position under a mobile ready-mix concrete vehicle, the waste bin having a base, sidewalls and a front end adjacent said mobile ready-mix concrete vehicle and a back end remote from said mobile ready-mix concrete vehicle, the back end having a chevron shape oriented on a longitudinal axis wherein the chevron shape has an apex which is pointed away from the front end, the waste bin having at least one baffle structure arranged on the longitudinal axis and spaced along the base extending between the sidewalls of the waste bin, the at least one baffle structure having a chevron shape generally conforming to the chevron shape on the back end, each of the at least one baffle structure having at least one fluid passing aperture at a lower edge of the at least one baffle structure adjacent to a side wall of the waste bin;

directing waste slurry into the waste bin;

allowing liquid and particles to drain through the at least one fluid passing apertures;

lifting the waste bin and transferring the waste bin to a waste handling bin for disposal; and discharging liquid through a port located at the back end of the waste bin.

\* \* \* \* \*